UNITED STATES PATENT OFFICE.

CLARENCE R. PEREGRINE, OF CHARLEROI, PENNSYLVANIA, ASSIGNOR TO MACBETH-EVANS GLASS COMPANY, A CORPORATION OF PENNSYLVANIA.

GLASS.

1,327,569.　Specification of Letters Patent.　Patented Jan. 6, 1920.

No Drawing.　Application filed September 24, 1917. Serial No. 192,886.

*To all whom it may concern:*

Be it known that I, CLARENCE R. PEREGRINE, a citizen of the United States, residing at Charleroi, in the county of Washington, and State of Pennsylvania, have invented a certain new and useful Glass, of which the following is a specification.

The invention relates to an improvement in glass and has for its objects, the provision of an improved relatively dense white glass which may be used with thin shades and powerful illuminating elements and satisfactorily transmit and diffuse the light therefrom; the provision of a glass which may be cheaply made, which is workable, and which does not show the dead white color characteristic of the well known milk glass.

Various foundation batches may be employed to which the coloring ingredients are added. One of such foundation batches which I have found to be satisfactory is as follows:

| | |
|---|---|
| Sand | 977.5 parts |
| Soda ash | 67.5 " |
| Borax | 66 " |
| Litharge | 60 " |
| Zinc oxid | 225 " |
| Niter | 40 " |
| Limestone | 115 " |
| Salt | 10 " |

The foregoing batch, which approximates 1500 parts, if used without the coloring ingredients, hereinafter referred to, will produce a substantially colorless clear glass, and various substitutes might be employed.

To the foregoing clear glass batch are added the coloring ingredients comprising the following compounds and quantities:

| | |
|---|---|
| Hydrate of aluminum | 260 parts |
| Sodium silico fluorid | 151 " |

The foundation batch together with the coloring compounds in powdered form are thoroughly mixed together and melted in the usual way.

The hydrate of aluminum ($Al_2H_6O_6$) contains 34.6% of aluminum, so that the 260 parts of aluminum hydrate has an aluminum content of about 90 parts. Other aluminum compounds, such as China clay, and feldspar, might be used instead of the hydrate, if an adjustment were made so as to secure the proper amount of aluminum.

The sodium silico fluorid ($Na_2SiF_6$) contains 60.6% of fluorin, so that in the 151 parts of this compound there are about 91 parts of fluorin.

Other fluorids might be used, such as cryolite, sodium fluorid and fluorspar, or combinations of fluorids may be employed, the primary requirement being the securing of the proper amount of fluorin, which is the coloring agent. However, if fluorspar is used alone it gives a relatively high calcium content resulting in a sandy, brittle glass, which is difficult to work.

It will also be understood that, aside from the substitution of equivalent compounds, as above indicated, the proportions of aluminum and fluorin may be modified to a considerable extent and still produce a glass having the general characteristics of that produced from the batch above set forth. For instance, the amount of fluorin may be increased as much as 50% or more, rendering the glass denser, the number of parts usable ranging from 90 to 140. Similarly, the amount of aluminum used may range from 90 to 150 parts depending upon the density of the glass required and the thickness of the glass.

I have found that the zinc oxid is very highly desirable in the basic batch, improving the quality of the glass and rendering it more readily workable. Such compound also assists in relieving the glass of the dead white color of the old milk glasses. Similarly, the lime-stone or some other ingredient containing calcium is very desirable, as the calcium oxid gives body to the glass rendering it more viscous and thus preventing the fluorin gas from escaping too readily through the glass. Other ingredients tending to make the glass more viscous, such as lead oxid or barium carbonate, might be employed instead of the lime-stone. If fluorspar is used as a partial substitute for the sodium silico fluorid, the lime-stone may be omitted, as in that case the calcium is supplied by the fluorspar. I have found that the use of the fluorspar together with the sodium silico fluorid constitutes a most satisfactory way of introducing the necessary fluorin, and it is also possible to use other combinations of fluorids or combinations of compounds for supplying aluminum.

What I claim is:

1. A glass formed by fusing together a mixture comprising approximately 1500 parts of a foundation batch capable of producing substantially clear glass, with a compound containing from 90 to 150 parts of aluminum and a compound containing from 90 to 140 parts of fluorin.

2. A glass formed by fusing together a mixture comprising approximately 1500 parts of a foundation batch capable of producing substantially clear glass and including zinc oxid, with a compound containing from 90 to 150 parts of aluminum and a compound containing from 90 to 140 parts of fluorin.

CLARENCE R. PEREGRINE.